US012151691B2

(12) United States Patent
Tian (10) Patent No.: US 12,151,691 B2
(45) Date of Patent: Nov. 26, 2024

(54) FILTERING PERCEPTION-RELATED ARTIFACTS

(71) Applicant: GM Cruise Holdings LLC, San Francisco, CA (US)

(72) Inventor: Feng Tian, Foster City, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 302 days.

(21) Appl. No.: 17/697,118

(22) Filed: Mar. 17, 2022

(65) Prior Publication Data

US 2023/0294716 A1 Sep. 21, 2023

(51) Int. Cl.
*B60W 50/02* (2012.01)
*B60W 60/00* (2020.01)
*G06V 10/98* (2022.01)
*G06V 20/56* (2022.01)

(52) U.S. Cl.
CPC .... *B60W 50/0205* (2013.01); *B60W 50/0225* (2013.01); *B60W 60/001* (2020.02); *G06V 10/98* (2022.01); *G06V 20/56* (2022.01)

(58) Field of Classification Search
None
See application file for complete search history.

(56) References Cited

U.S. PATENT DOCUMENTS

| | | | |
|---|---|---|---|
| 11,801,861 B2* | 10/2023 | Choe | B60W 50/06 |
| 2022/0297709 A1* | 9/2022 | Redford | G05D 1/0221 |
| 2023/0044279 A1* | 2/2023 | Lu | G06F 18/251 |

FOREIGN PATENT DOCUMENTS

EP 4102403 A1 * 12/2022 ............ B60W 50/06

* cited by examiner

*Primary Examiner* — Jaime Figueroa
*Assistant Examiner* — Atticus A Cameron
(74) *Attorney, Agent, or Firm* — Michael DiCato (57) ABSTRACT

The subject disclosure relates to techniques for filtering perception-related artifacts. The disclosed technology can include receiving, by a machine learning model, a first output generated by a perception system model onboard an autonomous vehicle, wherein the first output is based on sensor data received from sensors of the autonomous vehicle at a first time and includes an inaccurate perception of an environment around the autonomous vehicle, receiving, by the machine learning model, a second output generated by the perception system model onboard the autonomous vehicle, wherein the second output is based on sensor data received from sensors of the autonomous vehicle at a second time after the first time and includes an accurate perception of the environment around the autonomous vehicle, and altering, by the machine learning model, the inaccurate perception of the environment from the first output based on the accurate perception of the environment in the second output.

15 Claims, 6 Drawing Sheets

FILTERING PERCEPTION-RELATED ARTIFACTS

BACKGROUND

1. Technical Field

The subject technology provides solutions for filtering perception-related artifacts of an output of a perception system model of an autonomous vehicle, and more particularly to, leveraging data obtained at different points in time to identify perception system errors.

2. Introduction

Autonomous vehicles operate without human drivers. As autonomous vehicles navigate streets, the autonomous vehicles are obtaining sensor data that is fed into a perception system model. These perception system models run in real-time and are able to perceive the streets. However, these perception systems may inaccurately perceive objects in the environment around the autonomous vehicle. These inaccurate perceptions can result in suboptimal performance by the autonomous vehicle. Additionally, these inaccurate perceptions may be fed to other machine learning models that are then trained on inaccurate data, which can result in inaccurate or biased machine learning models.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles operate without human drivers. As autonomous vehicles navigate streets, the autonomous vehicles are obtaining sensor data that is fed into a perception system model. These perception system models can be used to detect static and dynamic objects, enabling the AV to reason about how to navigate through the environment. However, these perception systems may inaccurately perceive objects in the environment around the autonomous vehicle, resulting in suboptimal performance of the autonomous vehicle. Additionally, these inaccurate perceptions may be used to perform other processing tasks, such as used as inputs to other machine learning models, resulting in inaccuracies or other biases in downstream processing tasks.

While humans are able to understand that objects do not miraculously transform into other objects (e.g., a tree becoming a sign), conventional autonomous vehicles are not able to understand the change in perception. These inaccurate perceptions can cause issues, such as inefficient or suboptimal performance of autonomous vehicles.

Furthermore, it is an aspect of the present disclosure that these perception outputs may be useful in downstream processing tasks, such as prediction and planning software of autonomous vehicles. However, as discussed, these perception outputs may be inaccurate. Thus, these downstream processing tasks would be performed with inaccurate perception outputs can result in inaccurate and/or biased results.

Thus, the present technology addresses the need in the art for correcting inaccurate perception outputs (e.g., filtering out perception-related artifacts) from perception system models (e.g., a perception stack onboard an autonomous vehicle). More specifically, a data filtering service can be configured to receive perception data or outputs and filter the perception data based on additional perception data or outputs obtained before and/or after the inaccurate perception output. In other words, the present technology provides solutions for correcting inaccurate perception of objects by analyzing a perception of an object at a first time against additional perceptions of the object at another time. For example, when a perception system perceives an object as a tree and then perceives the object as a sign, the present technology can identify an inconsistency or discrepancy in the data. Then, the present technology can identify the accurate perception by analyzing additional perceptions of the object a few seconds earlier and/or a few seconds later.

As another example, an autonomous vehicle can be driving to a main road from a small exit and, due to other vehicles on the left-hand side, the autonomous vehicle can only see a portion of a vehicle, such as the top of a vehicle. At this time, the autonomous vehicle may not be able to detect that the vehicle is a vehicle because a majority of the vehicle occluded. However, a few second later, the autonomous vehicle will be able to collect enough information about the moving objects (e.g., the vehicle), such as size, moving speed or velocity, direction, location, etc. At that point in time, the autonomous vehicle can make a better prediction and perception of the vehicle. Accordingly, the present technology provides solutions to correct the perception at the initial time based on the better prediction and perception at another point in time.

Figure 1A:
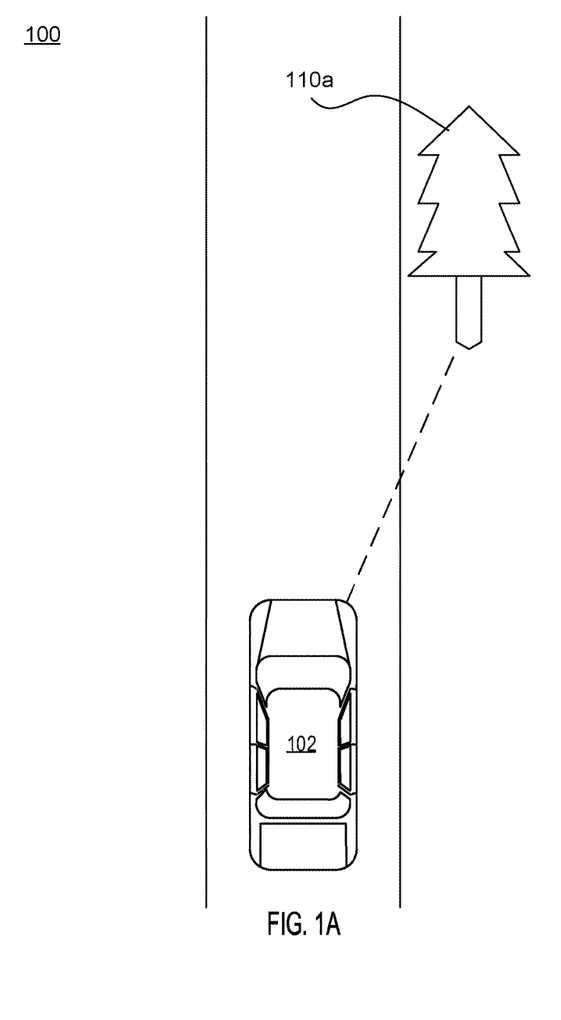
FIGS. 1A and 1B illustrate an environment having an autonomous vehicle and perceived objects in accordance with some aspects of the present technology.
Figure 1B:
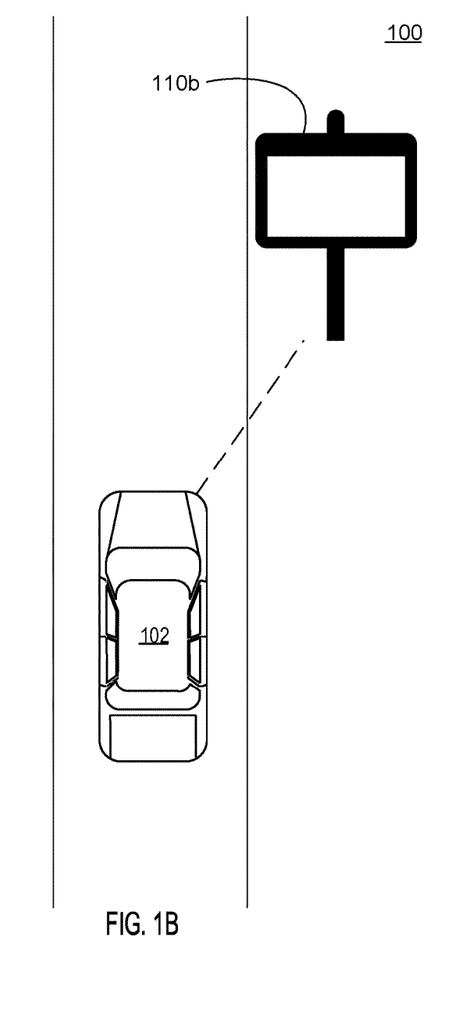

FIGS. 1A and 1B illustrates an environment 100 having an autonomous vehicle 102 and perceived objects. As autonomous vehicle 102 navigates streets, sensors of autonomous vehicle 102 may perceive objects. For example, FIG. 1A illustrates sensors of autonomous vehicle 102 perceiving an object 110a at a first time. More specifically, the autonomous vehicle 102 is perceiving object 110a as a tree at the first time. FIG. 1B illustrates the autonomous vehicle 102 perceiving an object 110b at a second time. More specifically, the autonomous vehicle 102 is perceiving object 110b as a sign at the second time.

In both FIGS. 1A and 1B, environment 100 is consistent, such that the objects 110a, 110b are actually the same object. In other words, as autonomous vehicle 102 continued navigating the roadway, autonomous vehicle 102 perceived the differently. Thus, autonomous vehicle 102 perceived either object 110a or object 110b inaccurately. While autonomous vehicles are not capable of changing the perception of the object in the moment of perceiving the object, a data processing system can analyze the perception of the object and/or track the object over time to determine an accurate perception. For example, as autonomous vehicle 102 navigates along the road, autonomous vehicle 102 may perceive the object as a tree 110a. However, as autonomous vehicle 102 continues along the road, autonomous vehicle 102 may perceive the object as a sign 110b. While autonomous vehicle 102 may not be able to identify which perception or label is accurate, a data processing system can track the perception of the object over time and determine that the object is actually a sign 110b.

Similarly, autonomous vehicle 102 may perceive objects that may not be present. For example, tree 110a may not actually be present, even though autonomous vehicle 102 perceives tree 110a. In other words, autonomous vehicle 102 is perceiving a perceived object 110a that does not exist as a false positive perception.

Likewise, autonomous vehicle 102 may miss perceiving an object that is present in environment 100. For example, sign 110b may actually be present, even though autonomous vehicle 102 does not perceive sign 110b. In other words, autonomous vehicle 102 is not perceiving an object 110b that exists as a false negative perception.

While autonomous vehicle 102 may not be able to rectify the false positive perception and/or the false negative perception based on future data (e.g., data obtained after the perception occurs), a data processing system can track the object over time and determine that the false positive perceptions are artifacts and identify objects that were false negative perceptions.

Figure 2:
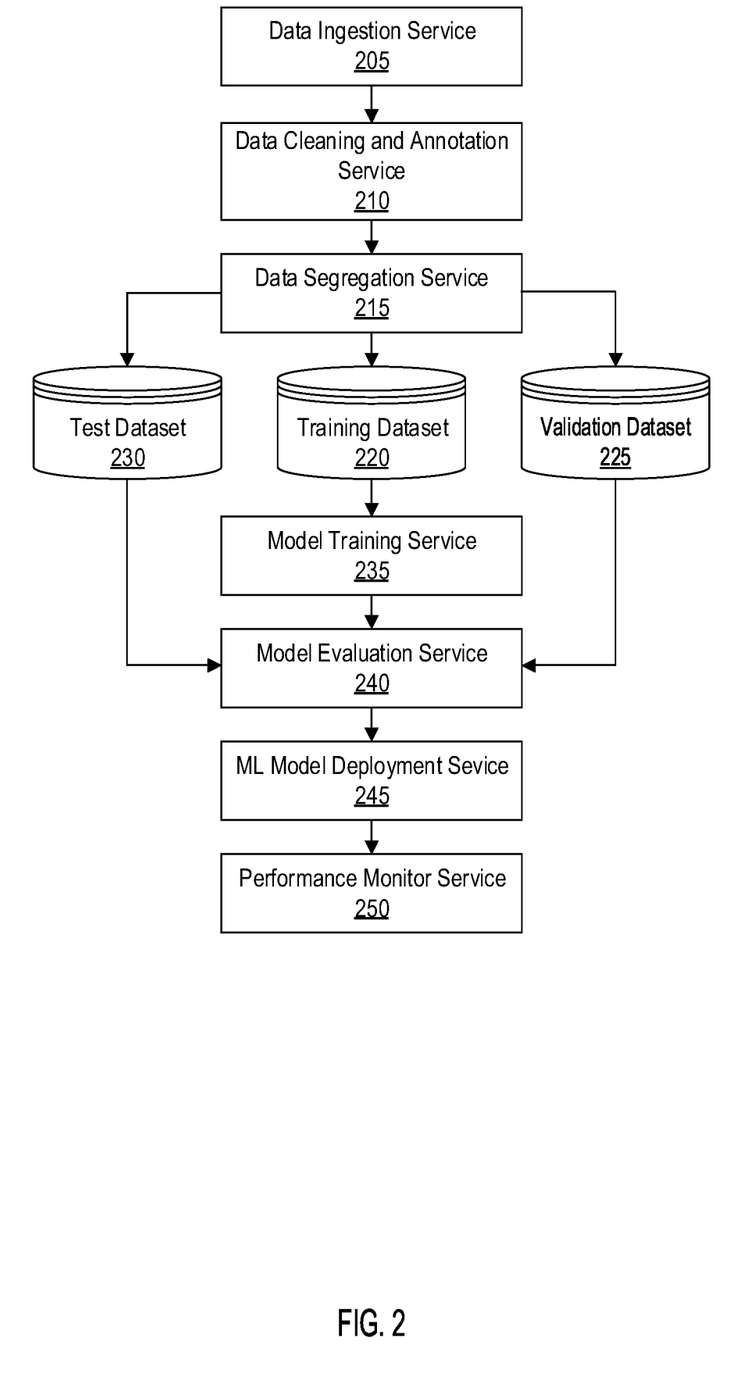
FIG. 2 illustrates an example lifecycle of a machine learning (ML) model in accordance with some aspects of the present technology.

FIG. 2 illustrates an example lifecycle 200 of a ML model in accordance with some examples. The first stage of the lifecycle 200 of a ML model is a data ingestion service 205 to generate datasets described below. ML models require a significant amount of data for the various processes described in FIG. 2 and the data persisted without undertaking any transformation to have an immutable record of the original dataset. The data itself can be generated by sensors attached to an AV, for example, but can also be provided from third party sources such as publicly available dedicated datasets used for research purposes. The data ingestion service 205 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data (e.g., an AV) from the consumer of the data (e.g., an ML model training pipeline). For offline data production, when source data is available from the producer (e.g., the AV), the producer publishes a message and the data ingestion service 205 retrieves the data. In some examples, the data ingestion service 205 may be online and the data is streamed from the producer (e.g., the AV) in real-time for storage in the data ingestion service 205.

After data ingestion service 205, a data preprocessing service preprocesses the data to prepare the data for use in the lifecycle 200 and includes at least data cleaning, data transformation, and data selection operations. The data preprocessing service 210 removes irrelevant data (data cleaning) and general preprocessing to transform the data into a usable form. In some examples, the data preprocessing service 210 may convert three-dimensional (3D) LIDAR data (e.g., 2D point cloud data) into voxels. The data preprocessing service 210 includes labelling of features relevant to the ML model such as people, vegetation, vehicles, and structural objects in the case of an AV. In some examples, the data preprocessing service 210 may be a semi-supervised process performed by a ML to clean and annotate data that is complemented with manual operations such as labeling of error scenarios, identification of untrained features, etc.

After the data preprocessing service 210, data segregation service 215 to separate data into at least a training dataset 220, a validation dataset 225, and a test dataset 230. Each of the training dataset 220, a validation dataset 225, and a test dataset 230 are distinct and do not include any common data to ensure that evaluation of the ML model is isolated from the training of the ML model.

The training dataset 220 is provided to a model training service 235 that uses a supervisor to perform the training, or the initial fitting of parameters (e.g., weights of connections between neurons in artificial neural networks) of the ML model. The model training service 235 trains the ML model based a gradient descent or stochastic gradient descent to fit the ML model based on an input vector (or scalar) and a corresponding output vector (or scalar).

After training, the ML model is evaluated at a model evaluation service 240 using data from the validation dataset 225 and different evaluators to tune the hyperparameters of the ML model. The predictive performance of the ML model is evaluated based on predictions on the validation dataset 225 and iteratively tunes the hyperparameters based on the different evaluators until a best fit for the ML model is identified. After the best fit is identified, the test dataset 230, or holdout data set, is used as a final check to perform an unbiased measurement on the performance of the final ML model by the model evaluation service 240. In some cases, the final dataset that is used for the final unbiased measurement can be referred to as the validation dataset and the dataset used for hyperparameter tuning can be referred to as the test dataset.

After the ML model has been evaluated by the model evaluation service 240, a ML model deployment service 245 can deploy the ML model into an application or a suitable device. The deployment can be into a further test environment such as a simulation environment, or into another controlled environment to further test the ML model. In the case of an AV, the ML model would need to undergo further evaluation inside a simulated environment and, after further validation, could be deployed in the AV. In some examples, the ML model could be implemented as part of the perception stack 112 to detect objects.

After deployment by the ML model deployment service 245, a performance monitor 250 monitors for performance of the ML model. In some cases, the performance monitor service 250 can also record performance data such as driving data that can be ingested via the data ingestion service 205 to provide further data, additional scenarios, and further enhance the training of ML models.

Figure 3:
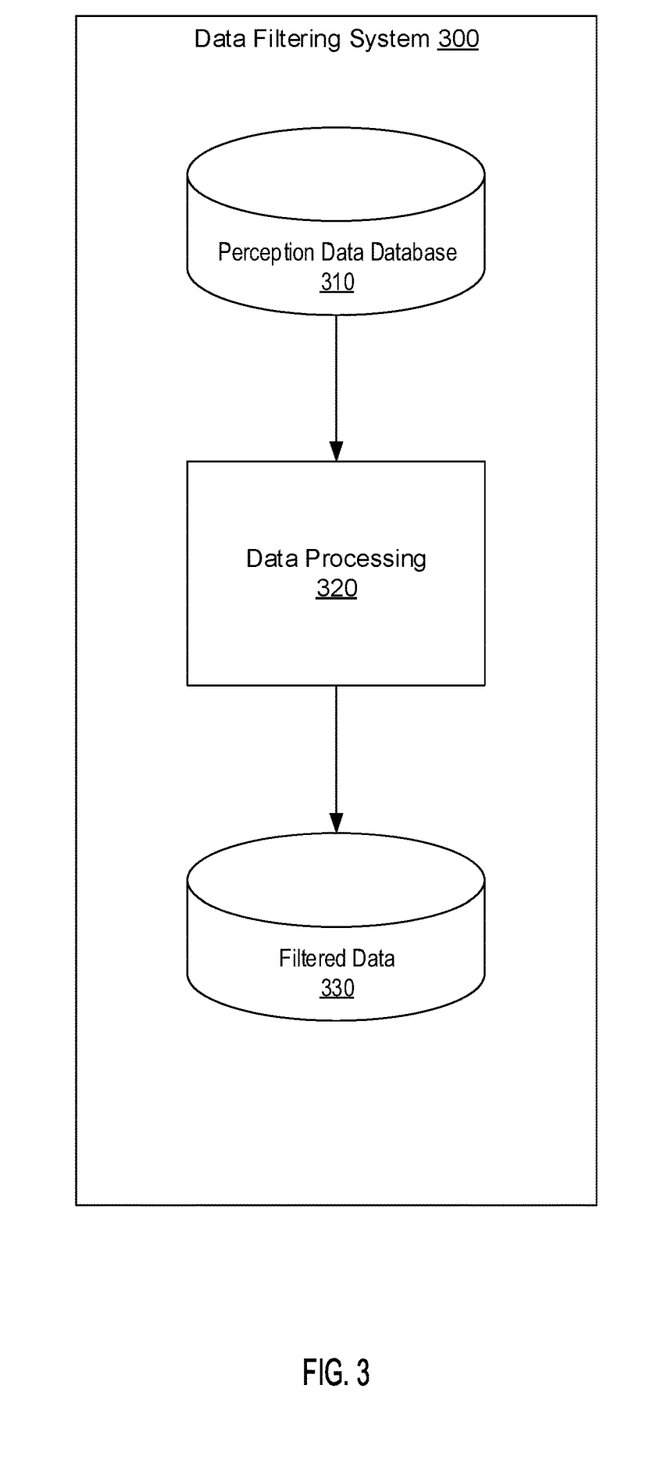
FIG. 3 illustrates an example data filtering system for filtering perception-related artifacts in accordance with some aspects of the present technology.

FIG. 3 illustrates an example data filtering system 300 configured to filter perception-related artifacts from outputs generated by a perception system model. In some embodiments, data filtering system 300 can be similar to or assume the role of data preprocessing service 210 as described above with respect to FIG. 2. Data filtering system 300 can access perception data database 310, process 320 the perception data, and generate filtered data 330.

Perception data database 310 is configured to receive, store, and allow access to perception data received from perception sensors (e.g., sensor systems onboard an autonomous vehicle and/or sensor systems 504-508, which will be discussed in further detail below with respect to FIG. 5). In other words, the perception data in perception data database 310 can be outputs generated by a perception system model onboard an autonomous vehicle (e.g., perceptions tack 512, which will be discussed in further detail below with respect to FIG. 5). For example, an output may include perceived objects in an environment around the autonomous vehicle, such that each perceived object can have one or more labels associated therewith. It is also contemplated that the output can include objects that show objects in the environment that were not accurately perceived (e.g., not accurately labeled, or not labeled at all).

Data processing 320 is a processing process that data filtering system 300 is configured to perform. In other words, data filtering system 300 can process 320 the perception data 310 to filter inaccurate perceptions from perception data 310. More specifically, data filtering system 300 can process 320 the perception data to rectify inaccurate labels, false positive perceptions, and false negative perceptions.

Data filtering system 300 can track objects a series of perception outputs. For example, a first output at a first time can include an object. A second output at a second time can also include the object. While the perception of the object may be different at each time, the existence of the object remains fixed. Thus, as data filtering system 300 tracks an object through one or more outputs (e.g., of a series of outputs), data filtering system 300 can determine whether each output is consistent with the rest of the outputs. For example, data filtering system 300 may track an object labeled as a tree over the series of outputs. In one output, the tree may be captured or perceived as a sign instead. Data filtering system 300 can then identify the inconsistency or discrepancy and flag that output as inaccurate. Inaccurate perception outputs can include inaccurate labels, false positive perceptions, and/or false negative perceptions.

For inaccurate labels, data filtering system 300 can identify an inaccurate label when a perceived object is perceived as one object type (e.g., a tree) over multiple outputs and perceived as a different object type (e.g., a sign) in one or a few outputs. Data filtering system 300 can then alter the output and change the label associated with the perceived object to the correct label.

For false positive perceptions, data filtering system 300 can identify a false positive perception when a perceived object is perceived in one or a few outputs and not perceived over multiple outputs. Data filtering system 300 can then alter the output and remove the perceived object from the inaccurate perception output.

For false negative perceptions, data filtering system 300 can identify a false negative perception when an object is not perceived in one or a few outputs and perceived over multiple outputs. Data filtering system 300 can then alter the output and inject the object into the inaccurate perception output.

Filtered data 330 is data that has been processed and is ready for use in training machine learning models. For example, filtered data 330 can be used as training dataset 220, validation dataset 225, and/or test dataset 230 as discussed above with respect to FIG. 2.

Figure 4:
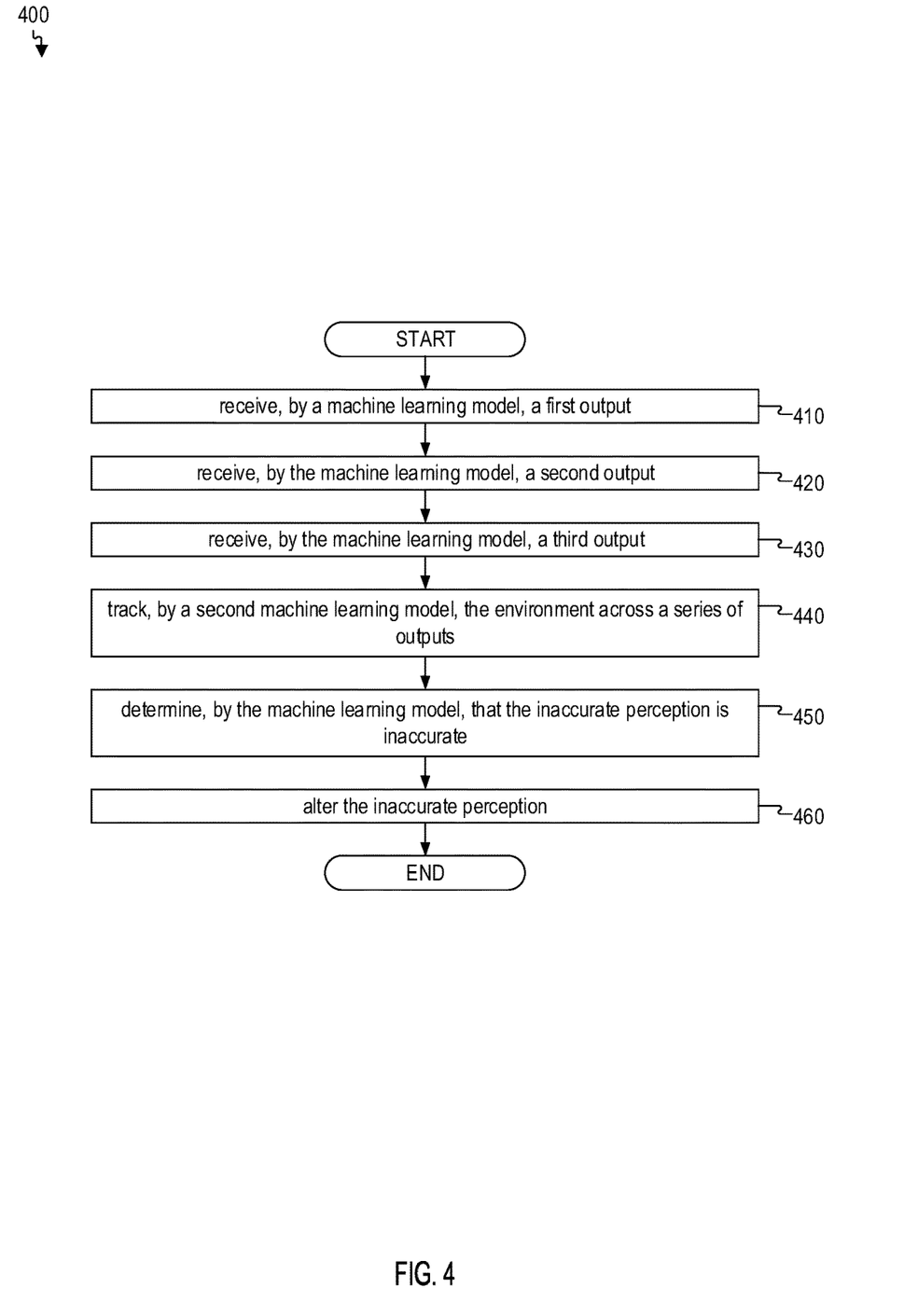
FIG. 4 illustrates an example method for filtering perception-related artifacts in accordance with some aspects of the present technology.

FIG. 4 illustrates an example method 400 for filtering perception-related artifacts from outputs generated by a perception system model (e.g., a perception system model onboard an autonomous vehicle or perception stack 512, which will be discussed in further detail below with respect to FIG. 5). Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

At step 410, method 400 includes receiving, by a machine learning model, a first output generated by a perception system model onboard an autonomous vehicle. For example, data filtering system 300 illustrated in FIG. 3 may receive, by the machine learning model, a first output generated by a perception system model onboard an autonomous vehicle. The first output can be based on sensor data received from sensors of the autonomous vehicle at a first time and includes an inaccurate perception of an environment around the autonomous vehicle. In some embodiments, the inaccurate perception is a false negative perception that does not include an object that is in an environment around the autonomous vehicle at the first time. In some embodiments, the inaccurate perception is a false positive perception that includes a perceived object that is not in the environment around the autonomous vehicle at the first time. In some embodiments, inaccurate perception is an inaccurate label of an object in the environment around the autonomous vehicle.

At step 420, method 400 includes receiving, by the machine learning model, a second output generated by the perception system model onboard the autonomous vehicle. For example, data filtering system 300 illustrated in FIG. 3 may receive, by the machine learning model, a second output generated by the perception system model onboard the autonomous vehicle. The second output can be based on sensor data received from sensors of the autonomous vehicle at a second time after the first time and includes an accurate perception of the environment around the autonomous vehicle. In some embodiments, the accurate perception includes the object in the environment around the autonomous vehicle at the second time. In some embodiments, the accurate perception does not include the object in the environment around the autonomous vehicle at the second time. In some embodiments, the accurate perception is an accurate label of the object in the environment around the autonomous vehicle. In some embodiments, the first output and the second output are a portion of a series of outputs.

At step 430, method 400 includes receiving, by the machine learning model, a third output generated by the perception system model onboard the autonomous vehicle. For example, data filtering system 300 illustrated in FIG. 3 may receive, by the machine learning model, a third output generated by the perception system model onboard the autonomous vehicle. The third output can be based on sensor data received from sensors of the autonomous vehicle at a third time before the first time and includes an accurate perception of the environment around the autonomous vehicle.

At step 440, method 400 includes tracking, by the machine learning model, the environment across a series of outputs generated by the perception system model. For example, data filtering system 300 illustrated in FIG. 3 may track, by the machine learning model, the environment across a series of outputs generated by the perception system model. In some embodiments, the first output and the second output are a portion of the series of outputs.

At step 450, method 400 includes determining, by the machine learning model, that the inaccurate perception is inaccurate based on a discrepancy in the environment across the series of outputs. For example, data filtering system 300 illustrated in FIG. 3 may determine, by the machine learning model, that the inaccurate perception is inaccurate based on a discrepancy in the environment across the series of outputs. In some embodiments, determining that the inaccurate perception is inaccurate is based on a discrepancy in the environment between the first output and the second output.

At step 460, method 400 includes altering, by the machine learning model, the inaccurate perception of the environment from the first output based on the accurate perception of the environment in the second output. For example, data filtering system 300 illustrated in FIG. 3 may alter, by the machine learning model, the inaccurate perception of the environment from the first output based on the accurate perception of the environment in the second output. In some embodiments, altering the inaccurate perception of the environment is further based on the accurate perception of the environment in the third output. In some embodiments, altering the inaccurate perception of the environment is further based on one or more discrepancies in the environment between or among outputs.

Figure 5:
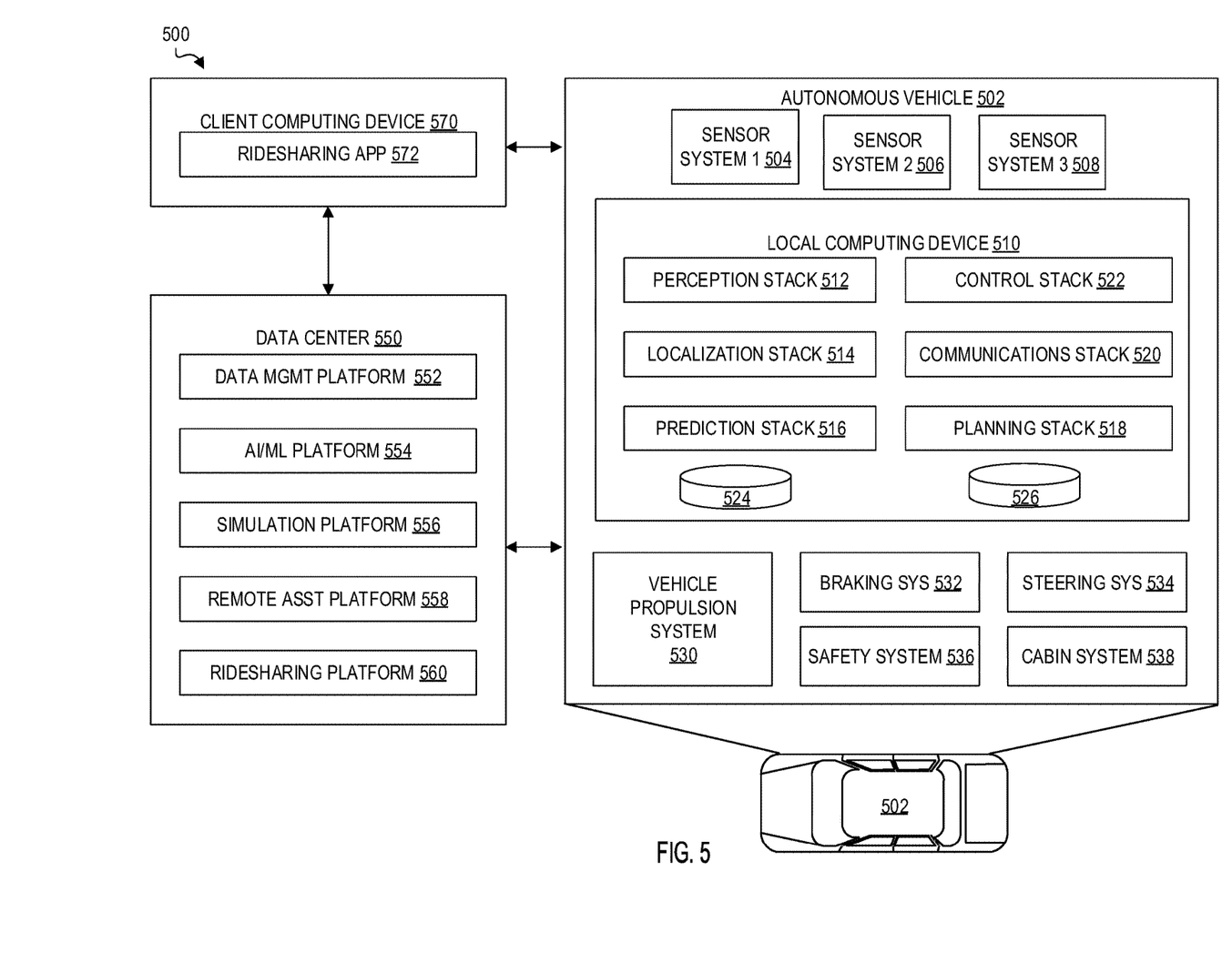
FIG. 5 illustrates an example of a system for managing one or more Autonomous Vehicles (AVs) in accordance with some aspects of the present technology.

FIG. 5 illustrates an example of an autonomous vehicle (AV) management system 500. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some embodiments, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a prediction stack 516, a planning stack 518, a communications stack 520, a control stack 522, an AV operational database 524, and a high definition (HD) geospatial database 526, among other stacks and systems.

The perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some embodiments, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The prediction stack 516 can receive information from the localization stack 514 and objects identified by the perception stack 512 and predict a future path for the objects. In some embodiments, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

The planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

The control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

The communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 526 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508, stacks 512-522, and other components of the AV 502 and/or data received by the AV 502 from remote systems (e.g., the data center 550, the client computing device 570, etc.). In some embodiments, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

The data center 550 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ridesharing platform 560, among other systems.

The data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, and other platforms and systems. Using the AI/ML platform 554, data scientists can prepare data sets from the data management platform 552; select, design, and train machine learning models; evaluate, refine, and deploy the models; maintain, monitor, and retrain the models; and so on. In some embodiments, AI/ML platform 554 can also include data filtering system 300.

The simulation platform 556 can enable testing and validation of the algorithms, machine learning models, neural networks, and other development efforts for the AV 502, the remote assistance platform 558, the ridesharing platform 560, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to pick up or drop off from the ridesharing application 572 and dispatch the AV 502 for the trip.

Figure 6:
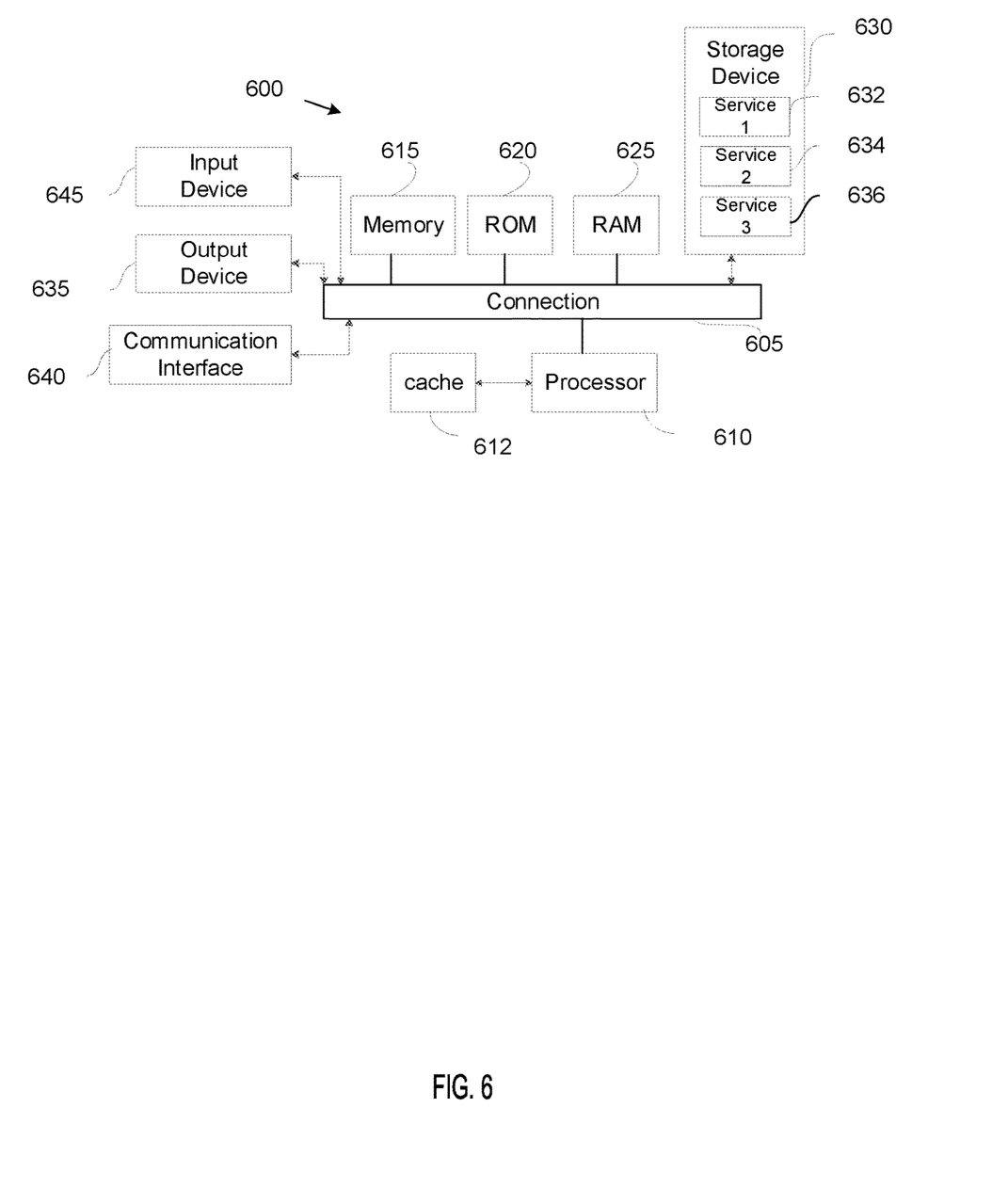
FIG. 6 shows an example of a system for implementing certain aspects of the present technology.

FIG. 6 shows an example of computing system 600, which can be for example any computing device making up autonomous vehicle 102, data filtering service 300, autonomous vehicle 502, local computing device 510, data center 550, client computing device 570, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A computer-implemented method comprising:
   receiving, by a machine learning model, a series of outputs generated by a perception system model, wherein the series of outputs comprises a first output and a second output,
   wherein the first output is generated by the perception system model based on sensor data received from sensors of an autonomous vehicle at a first time and includes an inaccurate perception of an environment around the autonomous vehicle;
   wherein the second output is generated by the perception system model based on sensor data received from sensors of the autonomous vehicle at a second time after the first time and includes an accurate perception of the environment around the autonomous vehicle;
   tracking, by the machine learning model, the environment across the series of outputs generated by the perception system model;
   determining, by the machine learning model, that the inaccurate perception is inaccurate based on a discrepancy in the environment across the series of outputs generated by the perception system model; and
   altering, by the machine learning model, the first output based on the second output.

2. The computer-implemented method of claim 1, wherein the inaccurate perception is a false negative perception that does not include an object that is in the environment around the autonomous vehicle at the first time, and wherein the accurate perception includes the object in the environment around the autonomous vehicle at the second time.

3. The computer-implemented method of claim 1, wherein the inaccurate perception is a false positive perception that includes a perceived object that is not in the environment around the autonomous vehicle at the first time, and wherein the accurate perception does not include the perceived object in the environment around the autonomous vehicle at the second time.

4. The computer-implemented method of claim 1, wherein inaccurate perception includes an inaccurate label of an object in the environment around the autonomous vehicle, and wherein the accurate perception includes an accurate label of the object in the environment around the autonomous vehicle.

5. The computer-implemented method of claim 1, further comprising:
receiving, by the machine learning model, a third output generated by the perception system model onboard the autonomous vehicle, wherein the third output is based on sensor data received from sensors of the autonomous vehicle at a third time before the first time and includes an accurate perception of the environment around the autonomous vehicle,
wherein altering the inaccurate perception of the perceived object is further based on the accurate perception of the environment in the third output.

6. A system comprising:
a storage configured to store instructions;
a processor configured to execute the instructions and cause the processor to:
receive, by a machine learning model, a series of outputs generated by a perception system model, wherein the series of outputs comprises a first output and a second output,
wherein the first output is based on sensor data received from sensors of an autonomous vehicle at a first time and includes an inaccurate perception of an environment around the autonomous vehicle;
wherein the second output is based on sensor data received from sensors of the autonomous vehicle at a second time after the first time and includes an accurate perception of the environment around the autonomous vehicle;
track, by the machine learning model, the environment across the series of outputs generated by the perception system model;
determine, by the machine learning model, that the inaccurate perception is inaccurate based on a discrepancy in the environment across the series of outputs generated by the perception system model; and
alter, by the machine learning model, the first output based on the second output.

7. The system of claim 6, wherein the inaccurate perception is a false negative perception that does not include an object that is in an environment around the autonomous vehicle at the first time, and wherein the accurate perception includes the object in the environment around the autonomous vehicle at the second time.

8. The system of claim 6, wherein the inaccurate perception is a false positive perception that includes a perceived object that is not in the environment around the autonomous vehicle at the first time, and wherein the accurate perception does not include the perceived object in the environment around the autonomous vehicle at the second time.

9. The system of claim 6, wherein inaccurate perception includes an inaccurate label of an object in the environment around the autonomous vehicle, and wherein the accurate perception includes an accurate label of the object in the environment around the autonomous vehicle.

10. The system of claim 6, wherein the instructions further cause the processor to:
receive, by the machine learning model, a third output generated by the perception system model onboard the autonomous vehicle, wherein the third output is based on sensor data received from sensors of the autonomous vehicle at a third time before the first time and includes an accurate perception of the environment around the autonomous vehicle,
wherein altering the inaccurate perception of the perceived object is further based on the accurate perception of the environment in the third output.

11. A non-transitory computer readable medium comprising instructions, the instructions, when executed by a computing system, cause the computing system to:
receive, by a machine learning model, a series of outputs generated by a perception system model, wherein the series of outputs comprises a first output and a second output,
wherein the first output is based on sensor data received from sensors of an autonomous vehicle at a first time and includes an inaccurate perception of an environment around the autonomous vehicle;
wherein the second output is based on sensor data received from sensors of the autonomous vehicle at a second time after the first time and includes an accurate perception of the environment around the autonomous vehicle;
track, by the machine learning model, the environment across the series of outputs generated by the perception system model;
determine, by the machine learning model, that the inaccurate perception is inaccurate based on a discrepancy in the environment across the series of outputs generated by the perception system model; and
alter, by the machine learning model, the first output based on the second output.

12. The computer readable medium of claim 11, wherein the inaccurate perception is a false negative perception that does not include an object that is in an environment around the autonomous vehicle at the first time, and wherein the accurate perception includes the object in the environment around the autonomous vehicle at the second time.

13. The computer readable medium of claim 11, wherein the inaccurate perception is a false positive perception that includes a perceived object that is not in the environment around the autonomous vehicle at the first time, and wherein the accurate perception does not include the perceived object in the environment around the autonomous vehicle at the second time.

14. The computer readable medium of claim 11, wherein inaccurate perception includes an inaccurate label of an object in the environment around the autonomous vehicle, and wherein the accurate perception includes an accurate label of the object in the environment around the autonomous vehicle.

15. The computer readable medium of claim 11, wherein the instructions, when executed by the computing system, further cause the computing system to:
receive, by the machine learning model, a third output generated by the perception system model onboard the autonomous vehicle, wherein the third output is based on sensor data received from sensors of the autonomous vehicle at a third time before the first time and includes an accurate perception of the environment around the autonomous vehicle, wherein altering the inaccurate perception of the perceived object is further based on the accurate perception of the environment in the third output.

* * * * *